Jan. 6, 1942.  E. R. WEBB  2,268,682
WELL SURVEYING INSTRUMENT
Filed Oct. 9, 1937   2 Sheets-Sheet 2
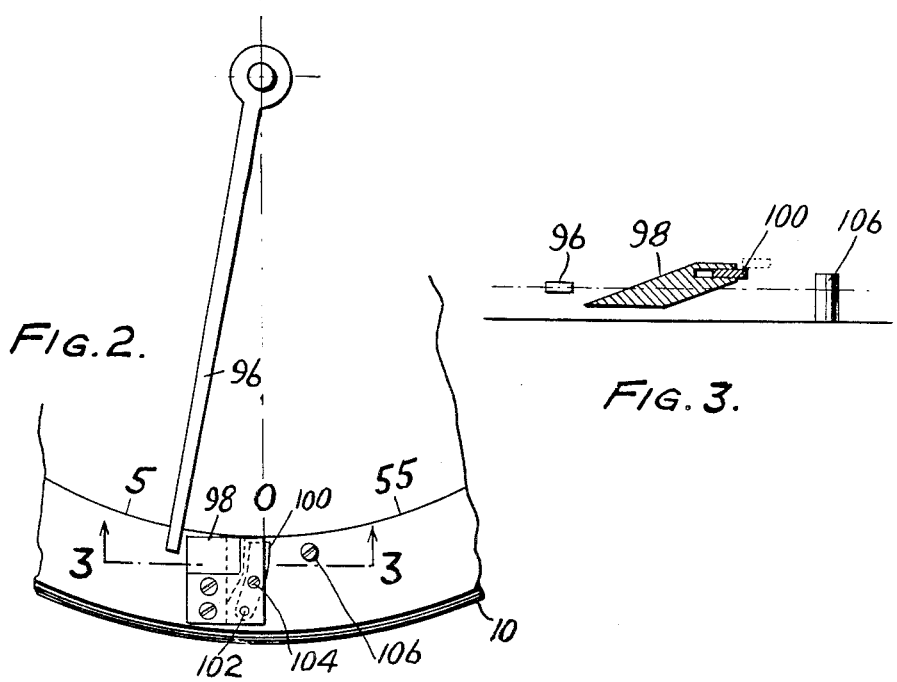
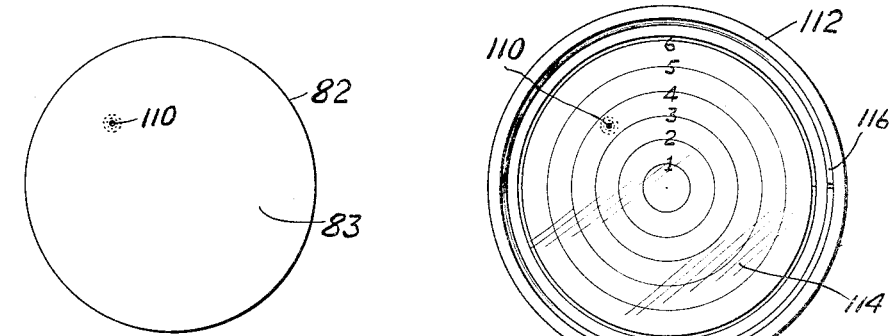
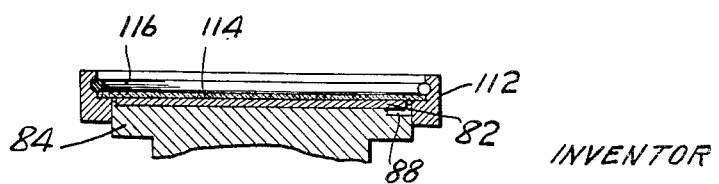
INVENTOR
Earnest Ray Webb
BY
ATTORNEYS
WITNESS:

Patented Jan. 6, 1942

2,268,682

UNITED STATES PATENT OFFICE 2,268,682

WELL SURVEYING INSTRUMENT

Earnest Ray Webb, Long Beach, Calif., assignor to Sperry-Sun Well Surveying Company, Philadelphia, Pa., a corporation of Delaware Application October 9, 1937, Serial No. 168,195

3 Claims. (Cl. 33—205.5)

This invention relates to a well surveying instrument of the type adapted to be lowered into a bore hole and provide a record by means of an electric spark.

In drilling oil wells or the like it may happen, due to variations in the strata through which the drill passes, or to other causes, that the bore hole will deviate to a considerable extent from the vertical. As a result of this deviation, the bore hole may miss entirely the formations which it was intended that it should penetrate and various conclusions based on assumptions that the hole is vertical may be seriously in error. To determine accurately the paths of bore holes, there have been devised various surveying instruments giving either complete or useful partial information concerning the paths of crooked holes. Through the use of these instruments, various causes of crooked holes have been determined and at present, by the exercise of proper care in drilling, deviations of holes from the vertical may generally be controlled so that the total deviations may become relatively slight. Deviations from the vertical, however, are cumulative and consequently it is desirable to continuously check the progress of the drill so that if even a slight deviation from the vertical occurs proper precautions may be taken to immediately straighten the hole. An instrument designed for the purpose of checking should be inexpensive in construction and readily used in a fashion impeding as little as possible the progress of the drilling, while nevertheless being capable of giving results having a high degree of accuracy in order that positive indication may be had of deviations from the vertical amounting to fractions of a degree.

The above discussion assumes that it is generally desirable that a bore hole should be vertical. This is usually true, but in isolated instances holes are intentionally deviated from the vertical for various purposes by the use of whipstocks. In such cases it becomes important to accurately trace the path of the bore hole in order to determine whether the desired result is being achieved, and accordingly a well surveying device must be capable of indicating accurately the path of the bore hole over large ranges of slopes.

In an application of George A. Smith, Serial No. 46,865, filed October 26, 1935, there is described a well surveying device of simple construction and of readily operated type, particularly designed for the checking of the progress of drilling by accurately recording small deviations from verticality, but nevertheless also adapted to accurately indicate large deviations as well as small ones. In said application, the well surveying device is illustrated as of a form designed to give records of both inclination and the azimuth in which the maximum inclination occurs. The improvements of said application, however, may be embodied in a simple form of apparatus in which inclination alone is recorded. Briefly stated, both indications are made by causing a spark to mark a record member, which is accurately located within the instrument relative to electrode members, in accordance with the deviations of a bore hole from verticality.

It has been found that the records of the spark recording type of instrument may be considerably improved by the utilization of metallic record elements together with a proper pendulum arrangement to insure that a spark will make a record of maximum sharpness. The necessity for this will be appreciated when it is considered that instruments, particularly of the type indicating inclination only, must be of very small diameter and that, consequently, if a useful range of angles is to be recorded, the differences in the record indications for a given angular displacement must be relatively small. On the other hand, deviations should be accurately given to about a tenth of a degree. The record mark which is made by the spark must, therefore, be of quite small size and the variable member producing such mark must be very accurately located in proper position by the inclination of the instrument. Furthermore, the entire device must be quite rugged and, in general, capable of go-devil operation, which involves much jarring and abuse of the variable portions of the mechanism.

It is the broad object of the invention to provide improvements along the lines indicated to secure a rugged, reliable and accurate instrument. While the invention will be particularly described in conjunction with an instrument designed to record inclination, it will be obvious from what follows that the invention is directly applicable to an instrument for recording both inclination and direction of the type referred to in said Smith application.

The above objects and others, primarily relating to details of construction, will be apparent from the following description read in conjunction with the accompanying drawings in which:

Figure 1, comprising parts A, B and C, illustrates the improved well surveying instrument, A, B and C, respectively, indicating various portions of the same from the top to the bottom thereof, the lower portion of B and the upper portion of C duplicating their showings to some slight extent for clearness;

Figure 2 is an enlarged diagrammatic view illustrating a quick make and break arrangement for interrupting the operation of a spark coil and for limiting the operation of the coil to a relatively short period;

Figure 3 is a sectional view taken on the plane the trace of which is indicated at 3—3 in Figure 2;

Figure 4 is a plan view of a recording disc having a record thereon.

Figure 5 is a fragmentary sectional view showing the construction and use of a device for accurately reading inclination from the record member; and Figure 6 is a plan view of the subject of Figure 5.

Figure 1:
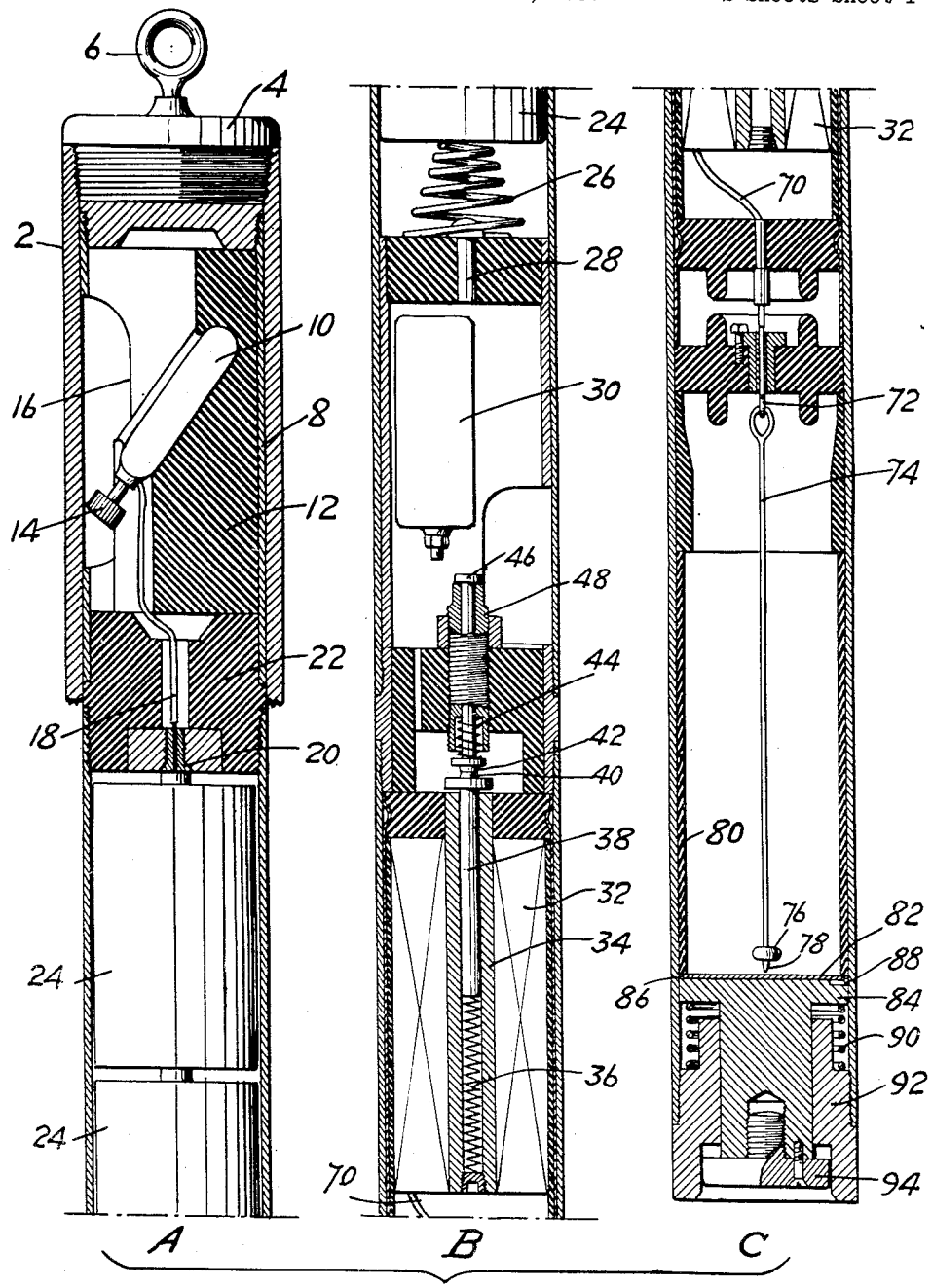

As is necessary in an instrument of this character, an outer casing 2, closed by a cap 4, which is provided with means 6 for the lowering of the instrument, encases the working parts and protects them against entry of mud under the high pressures encountered in a deep bore hole. Within the outer casing is a sectional inner casing indicated at 8, which provides various chambers carrying the elements of the device. Referring first to A of Figure 1, the upper chamber contains a clockwork mechanism 10 in the form of a somewhat modified watch, supported in a block of rubber or similar protective material so that its face is visible from the outside of the inner casing through an opening 16 and its winding stem 14 is made accessible to an operator. This watch, which will later be referred to, is modified by removal of its hour and minute hands and substitution for the latter of a more flexible contact making hand which is adapted to close and then open the primary circuit of a spark coil.

A conductor 18 extending from the contact arrangement of the watch passes through a plug 22 of insulating material and is soldered to a stud 20 with which there makes contact the center pole of the uppermost of a series of small flashlight batteries, indicated at 24, of which a suitable number may be provided to furnish the necessary voltage and current to operate a spark coil. These batteries are insulated in the usual fashion from the metallic wall of their containing chamber by paper wrappings. The lowermost battery rests upon a spring 26 which is in turn connected to a terminal 28 carried by an insulating block, and connected to a primary contact of the spark coil.

Below the batteries is the spark coil chamber in which may be located the usual primary condenser 30 and a spark coil the winding of which is indicated at 32. This winding surrounds an iron core 34 which is bored to receive a spring 36 urging outwardly from the core the head of an armature 38 to press its contact 40 into engagement with the contact 42 normally pressed toward it by a spring 44 and provided with a limiting head 46, engageable with the adjustable supporting bushing 48. The springs 44 and 36 oppose each other in such fashion as to provide reliable operation in well known fashion. One end of the secondary of the spark coil is grounded, as is also one end of the primary, while the other end of the secondary winding is connected to a conductor 70 having electrical connection with a supporting loop 72 engaging a loop at the upper end of a pendulum rod 74. At its lower end the pendulum rod 74 has a weighted head 76 into which is threaded a sparking point 78 made of iridium or some other suitable noncorrosive metal. This sparking point is preferably rounded so as to have a radius of curvature on the order of .01 to .02 inch. It is found that such a radius of curvature is desirable to produce accurate sparking rather than a sharp point, inasmuch as the latter seems to produce a corona effect which is likely to result in deviations of the spark from the shortest path between the point and the record member. Whereas greater accuracy of positioning of a pendulum is usually attainable by the use of a heavy bob, which minimizes friction at the supports, such a pendulum will oscillate over a long period after being set in motion. In an instrument of the present type it is desirable that the pendulum be damped by the air relatively rapidly so that when the record is made it will be stationary. It has been found that by the use of a suspension such as that illustrated, comprising one loop engageable within another, the friction at the suspension is so far reduced that a quite light bob is sufficient to attain the desired high degree of accuracy, while at the same time the mass of the pendulum is so small that damping due to the air takes place quite rapidly. While with a shower of sparks extending over a short period, but one sufficiently long that a large number of sparks will jump, motion of the pendulum is quite satisfactory, inasmuch as the center of swing may be used for a very accurate determination of inclination, such a record is somewhat more difficult to read than one involving a single point made by a series of sparks so that, in general, a stationary pendulum, accurate but radiply damped, is desirable.

Below the pendulum 78 is located the record disc 82, the construction and the location of which relative to the pendulum will be referred to hereafter. This record disc 82 is pressed upwardly against the insulating liner 80 of the pendulum chamber by reason of its location in a pressure member 84, provided with a rim 86 forming a depression accurately fitting the record disc and holding it exactly centrally located within the instrument. The pressure member 84 in turn fits very accurately the walls of the casing with the result that the location of the disc with respect to the axis of the instrument is very accurately determined. Inasmuch as the record disc fits very closely the rim 86, it is difficult to remove therefrom and desirably, therefore, a slot 88 is provided in the rim and the member 84 in which there may be inserted a pin or the like for removing the record disc. In order that the disc is tightly pressed against the liner 80, which serves to accurately locate it with respect to the sparking point of the pendulum, the member 84 is pressed upwardly by a relatively strong spring 90 reacting between it and a plug 92 adapted to be threaded into a lower end of the housing 84. The presence of the spring insures that even though the plug may not be threaded all the way into the casing, the record member will be accurately positioned with respect to the pendulum. A head 94 limits the expansion of the spring 90 and thus provides a record disc holding unit when the plug is removed from the instrument.

It has been found that proper records by a spark are rather difficult to obtain. If an insulating member is located between two conductors so that the spark must jump through it, then, though the sparking point is located quite close to or in contact with the insulating material, it is likely that the spark will not take the shortest geometrical path, but will rather take a path deviating therefrom inasmuch as insulating materials are practically never perfectly homogeneous from the standpoint of paths of minimum resistance to the passage of a spark. Furthermore, a series of sparks generally does not cure the inaccuracy resulting from such sparking, inasmuch as the first spark creates a path of very much lower resistance and all subsequent sparks will follow that same path. However, this is not the major difficulty with the use of insulating material for recording purposes. The principal difficulty is that the records so made are so fine as to be quite difficult to see. With paper, for example, a spark produced by a coil of suitable size to enter a well surveying instrument will not be sufficiently hot to produce any appreciable charring, and the result is generally an extremely minute hole which can scarcely be discerned even when a light is observed through it.

In accordance with the present invention, an improved type of record member is provided. Generally speaking, it has been found that metallic members, preferably discs 82 covered with a very thin but visible coating 83 of material contrasting in appearance with the metal of the disc, form highly satisfactory record members inasmuch as the spark jumping to the covered surface appears to have a mechanical action resulting in locally knocking off from the disc the coating at the point where the spark strikes the disc. In general, furthermore, thin coatings provide marks having very definite and minutely defined centers, but surrounded with halos which make the recognition of the center very easy. The type of marking produced is indicated at 110 in Figure 4.

While metallic discs coated with coating compositions such as very thin lacquers or the like have been found to produce fair records along the lines just indicated, most such compositions are difficult to put on extremely thinly and, furthermore, though the record member is, as a whole, electrically conductive, are very thin electrical insulators likely to exhibit inhomogeneity of the type mentioned above. The best record members have been found to comprise metallic discs coated very thinly with metals or oxides. For example, it has been found that metallic nickel or its oxide may be deposited either by dipping or by electro-deposition upon the surface of brass, German silver or aluminum discs. The black deposits of nickel or its oxide thus provided are removed by sparks, uncovering the underlying metal which forms a sharp contrast with the remainder of the surface. In general, such points are surrounded by slight halos which render them even more visible and distinguishable from any accidental defects of the surface which might have revealed the underlying metal. In particular, it has been found that such coating covered with an extremely thin film of oil, for example, merely by being wiped with an oily cloth, exhibits the formation of a halo to a high degree.

By dipping iron or steel in a solution of copper salt, copper will be deposited in the well known fashion. Such a copper deposit if kept quite thin is found to be affected by sparks in the general fashion described. The results are much improved if the coated disc is heated to a sufficiently high degree to transform the copper to a reddish deposit of cuprous oxide. With the cuprous oxide coating records of a high degree of permanence are provided, while those formed with the original copper coating appear prone to fade out after a time. As another example, a thin electrolytic deposit of lead on brass has been found to form an effective record member.

Of non-metallic coatings, probably the best comprises lamp black fixed on a metallic disc by a very thin film of shellac deposited from alcoholic solution. The lamp black in such case renders the coating fairly conductive. If a light metal such as aluminum is used, the result of the passage of a spark is a bright spot in the black field. Numerous other deposits of very thin nature have been found to work satisfactorily, though the metallic deposits appear most satisfactory inasmuch as they are very permanent and resistant to handling. Rubbing with the fingers generally has no appreciable effect on the records formed on such members.

Instead of using metal discs as the backgrounds for coatings which may be affected by sparks, it is possible to use discs of paper or the like covered with metallic foils or conductive metal paints. In the case of foils, the spark sensitive surface may be provided by electrical or other deposition, as in the case of the use of rigid metallic discs. In the case of metallic conductive paints, the material affected by the spark is preferably applied as an additional coating, desirably including lamp black or some other material to render it fairly conductive to avoid inhomogeneities of an insulating nature.

A second factor of considerable importance in securing a good record is the spacing of the sparking point of the pendulum from the surface of the record member when this consists of a metallic disc carrying a coating as above described. Using an iridium point of the type indicated above, which minimizes the effect of corona, and using a spark coil of small size, which becomes unreliable in producing a spark when the spacing exceeds about .02 inch, it has been found that the minimum gap should be about .002 inch. Not only is a gap less than this difficult to arrange in an instrument of this character without producing actual contact, but sparks jumping such a gap do not produce distinct centers in their markings. This is, perhaps, due to the fact that with such small gaps the sparks may not jump from the portion of the point most closely approaching the disc and because of the small gap the heating effect of the substantial currents resulting may be such as to produce motion of the adjacent air and consequent moving of the spark from its geometrically shortest path. This minimum gap limitation seems to hold, in general, for larger coils.

When the gap is increased so as to be within the range .004 to .010 inch, the best results are obtained, giving very good center markings and uniform halos. If the gap is increased to .02 inch with the coil above mentioned, the centers still appear small and sharply defined, but the halo is apt to be unsymmetrical. Such a condition of the halo, however, is not objectionable since the center marking is used for record purposes, the halo merely identifying a center produced by the spark.

With higher voltage coils, the upper limit of .02 inch no longer holds. So long as the voltage of the coil is quite sufficient to jump a gap without the occurrence of intermittent sparking indicative that the gap is approaching a maximum for the secondary coil voltage, the sparks produced are thin and straight and produce good markings. However, as the length of gap is increased, such straight sparks are likely to deviate from the geometrically shortest path and to the extent, roughly, of about one tenth of the spark gap. Thus, for example, a spark jumping a .1 inch gap is likely to deviate to the extent of about .01 inch from the geometrical center, and if the first spark so deviates it is rather likely that the majority or all of those following in a series will jump to the same point. Inasmuch as it may be desirable to read the records to approximately .01 inch, it will thus be seen that the maximum gap using a coil well able to produce consistent straight sparks over such gap is about .1 of an inch. Briefly stated, the maximum gap that should be used is of such order that the spark will jump in a thin straight line to a point deviating from the geometrically shortest path to a degree less than the permissible error, which is of the order of the radius of the mark produced. The minimum length of the gap should be such that the heating effect due to the larger currents resulting from the use of a short gap will not be sufficient to produce an arc rather than spark, and such that due to the short gap, there will not be a spraying of a series of sparks over a relatively large area; or, in other words, such that the marks produced are not substantially larger than those produced at greater spacings. This, of course, precludes the use of very small gaps with large capacity coils. Large coils, however, are not generally applicable in instruments of this character because of the limited space requirements. In general, the coils that can be used contain secondaries of quite high resistance very substantially limiting the flowing current. A primary condenser not only decreases arcing and distribution of the primary contacts, but produces sparks of more satisfactory character for recording purposes.

The time controlled switch in the primary circuit of the coil may take various forms, but should preferably be of a type which maintains contact for a relatively short period in order to prevent drain on the batteries. While the sparking period should be short, nevertheless there should pass a considerable shower of sparks for periods from, say, five to fifteen seconds, not only to produce a thoroughly visible record, but also to serve to indicate whether or not the record is reliable. If the pendulum is stationary such a shower of sparks will produce a point record such as indicated in Figure 4. If the pendulum is swinging only slightly, the result will generally be a line having a length corresponding to the amplitude of swing. If such a line is short the center of it will be a quite accurate indication of the vertical position of the pendulum. However, in the event that such a line is unduly long, the record should be discarded because it probably indicates that the instrument was subjected to some movement or that the pendulum was perhaps out of its normal position at the time the record was made. For example, if the pendulum happened to stick in some position due to friction at its pivot, the first spark might release it, whereupon it would be set into motion through a substantial arc. This would be indicated on the record member.

Inasmuch as the primary of a coil of sufficient capacity to make a good record may take considerable current, and since the elements controlling the time switch necessarily move rather slowly, it is preferable to provide a quick make and quick break type of contact. One form for this is illustrated in Figures 2 and 3. The clockwork mechanism 10 drives an hour hand 96 which is of flexible form and arranged to ride upwardly during its advancing movement over an insulating member 98 which carries an adjustable contact element 100 pivoted at 102 and adjustably held by a set screw 104 so as to position it to a predetermined extent beyond the edge of the member 98. The hand, in advancing, passes upwardly over the member 98, then drops upon the contact member 100, as illustrated in Figure 3, to close the primary circuit of the coil, and then, after the short interval determined by the projection of the member 100, drops therefrom to break the primary circuit. The hand preferably is limited in its movement by a pin 106 which stops the mechanism. The arrangement is desirably such that upon manipulation of the rewinding stem 14 the hand is rotated in a reverse direction, whereupon it passes beneath the projecting portion of the insulating member 98 without making contact and may be positioned to a point on the dial marked with the time which will elapse before the next contact is made.

While the record discussed may be marked with concentric rings indicating angular displacements of the pendulum, such markings are preferably not made because they necessarily interfere with the continuity and homogeneous nature of the surface of the disc. Inasmuch as the disc is accurately positioned in the member 84, it is possible to locate on this member a reading device of the type illustrated in Figures 5 and 6, comprising a ring 112 arranged to closely fit the periphery of the member 84 and carrying a transparent member of glass or Celluloid 114 which carries markings indicative of the angle of deviation, the member 114 being held in position within the ring 112 by a split wire ring 116. When the reading device is superimposed over the record member 82 the position of the record 110 may be read to a high degree of accuracy.

In the use of the apparatus, a record disc is placed within the rim of the member 86, which is then located in the instrument by screwing into the casing the plug 92. This serves to locate the disc relative to the pendulum to a high degree of accuracy quite independently of whether or not the plug 92 is threaded completely into the casing. The clockwork mechanism is then adjusted and simultaneously wound to locate the hand 96 in such position that a suitable time will elapse prior to the making of a record to enable the operator to lower the instrument to a desired position in the bore hole. The instrument is then permitted to remain stationary in its lowered position until the time for the making of the record has elapsed, whereupon it may be removed, and the reading device of Figures 5 and 6 placed over the record disc carried by the pressure member 84 and the deviation read from the scale. The result may be marked on the back of the record disc for future reference.

What I claim and desire to protect by Letters Patent is:

1. In combination, a pendulum, means for supporting the pendulum and an electrically conductive record member with a free end of the pendulum adjacent said record member, the pendulum having, relative to said record member, a location which is variable upon inclination of the supporting means, and having variable spacing relative to the record member depending upon the location of the pendulum, and means for producing a spark between said pendulum and record member to mark the latter, the spacing of the pendulum and record member and the spark voltage being such that, within the effective range of variable location of the pendulum, the spark will be substantially straight and will deviate from the point of the record member closest to said pendulum only to an unobservable extent.

2. In combination, a pendulum, means for supporting the pendulum and an electrically conductive record member with a free end of the pendulum adjacent said record member, the pendulum having, relative to said record member, a location which is variable upon inclination of the supporting means, and having variable spacing relative to the record member depending upon the location of the pendulum, and means for producing a spark between said pendulum and record member to mark the latter, the spacing of the pendulum and record member and the spark voltage being such that, within the effective range of variable location of the pendulum, the spark will be substantially straight and will deviate from the point of the record member closest to said pendulum only to an unobservable extent, the minimum spacing being such that the mark produced at that spacing is not substantially larger than the mark produced at greater spacings.

3. In combination, a pendulum, means for supporting the pendulum and an electrically conductive record member with a free end of the pendulum adjacent said record member, the pendulum having, relative to said record member, a location which is variable upon inclination of the supporting means, and having variable spacing relative to the record member depending upon the location of the pendulum, and means for producing a spark between said pendulum and record member to mark the latter, said pendulum presenting toward the record member a rounded point having a radius of curvature of the order of .01 to 0.2 inch.

EARNEST RAY WEBB.